(12) United States Patent
Kedlaya et al.

(10) Patent No.: US 12,430,118 B2
(45) Date of Patent: Sep. 30, 2025

(54) SYSTEMS AND METHODS FOR PERFORMING DATA FIXES

(71) Applicant: SAP SE, Walldorf (DE)

(72) Inventors: Arjun Shashikumar Kedlaya, Bengaluru (IN); Satish Kumar Kara, Bengaluru (IN)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 18/332,961

(22) Filed: Jun. 12, 2023

(65) Prior Publication Data

US 2024/0411543 A1  Dec. 12, 2024

(51) Int. Cl.
| | |
|---|---|
| *G06F 7/00* | (2006.01) |
| *G06F 8/65* | (2018.01) |
| *G06F 16/23* | (2019.01) |
| *G06F 16/242* | (2019.01) |
| *G06F 16/25* | (2019.01) |

(52) U.S. Cl.
CPC ............ *G06F 8/65* (2013.01); *G06F 16/2386* (2019.01); *G06F 16/2443* (2019.01); *G06F 16/256* (2019.01)

(58) Field of Classification Search
CPC .... G06F 8/65; G06F 16/2386; G06F 16/2443; G06F 16/256
USPC ........ 707/610, 613, 639, 748, 751, 803, 805, 707/999.01, 999.102
See application file for complete search history.

(56) References Cited

U.S. PATENT DOCUMENTS

| | | | |
|---|---|---|---|
| 10,713,251 B2* | 7/2020 | Weissman | G06F 16/2358 |
| 10,901,728 B1* | 1/2021 | Negoshian | G06F 8/61 |
| 2011/0093773 A1* | 4/2011 | Yee | G06F 16/986 |
| | | | 715/234 |
| 2016/0283219 A1* | 9/2016 | Banford | G06F 8/65 |
| 2020/0225931 A1* | 7/2020 | Nandula | G06F 9/45558 |

* cited by examiner

*Primary Examiner* — Md I Uddin
(74) *Attorney, Agent, or Firm* — Fountainhead Law Group, PC

(57) ABSTRACT

Embodiments of the present disclosure include techniques for performing data fixes. In one embodiment, a list of schemas and access information for the schemas is received from a schema manager. The schemas are batched for processing. During processing, schemas in a batch are processed in parallel. Processing includes applying preconfigured SQL commands. If the data fix is successful, applications may be deployed. If the data fix is not successful, application deployments may be blocked.

16 Claims, 6 Drawing Sheets

SYSTEMS AND METHODS FOR PERFORMING DATA FIXES

BACKGROUND

The present disclosure relates generally to software system, and in particular, to systems and methods for performing data fixes.

Databases store a wide variety of data, some of which may be sensitive and critical for business operations. If a business or security requirement arises such that a particular subset of the data stored in database needs to be changed, deleted, or modified, then a data fix mechanism needs to be in place to ensure that certain data requirements are satisfied. Data fixes in modern computer system environments is a complex problem where multiple limitations and challenges need to be considered for designing the solution. The conventional way of doing data fixes is for a system administrator with security privileges to manually login to a database and execute generic SQL commands to implement the fixes. However, this is a cumbersome process as there can be thousands of customer schemas in production across various regions and data centers.

The present disclose is directed to techniques for improving data fixes in database systems.

DETAILED DESCRIPTION

Described herein are techniques for performing data fixes. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
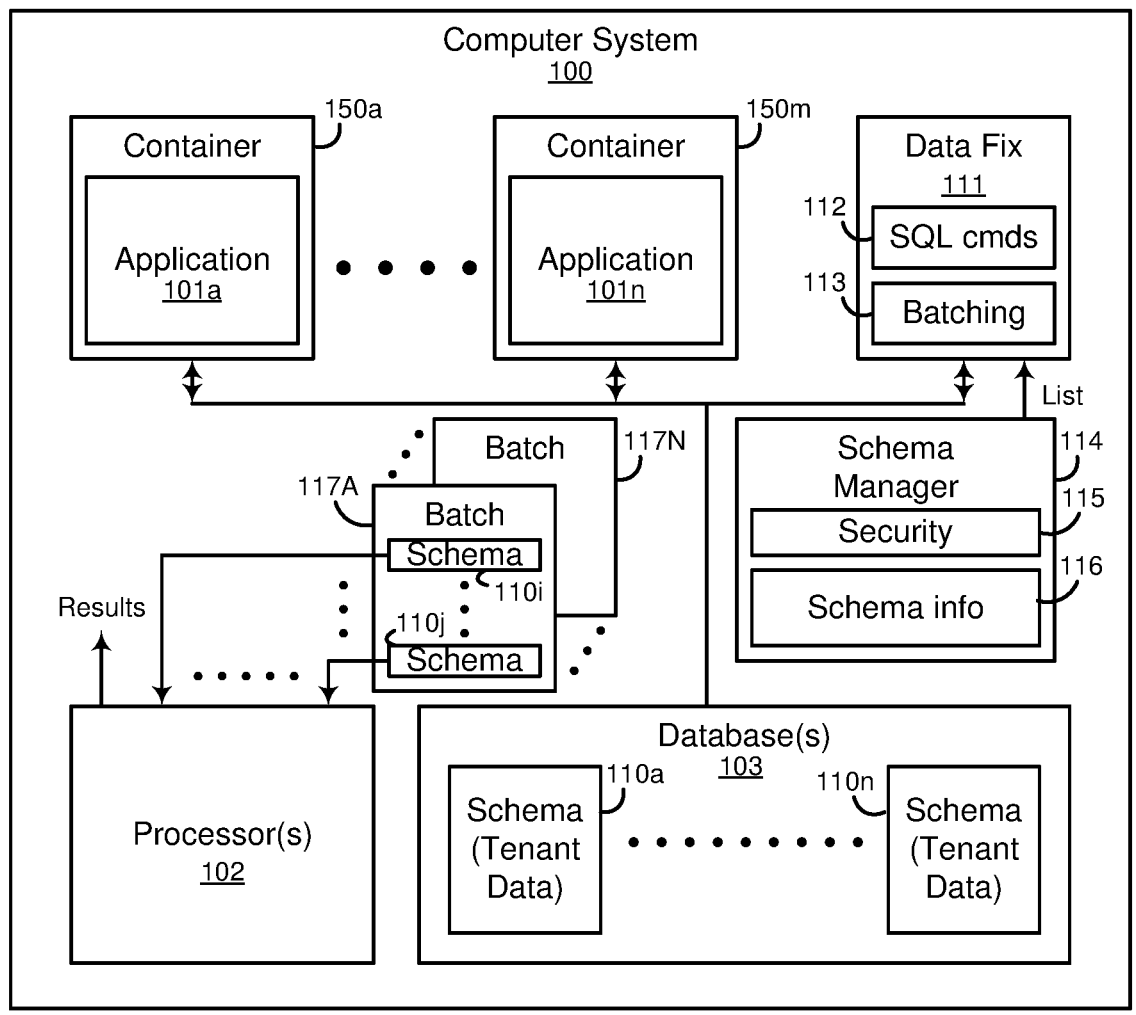
FIG. 1 illustrates a system for software system for performing data fixes according to an embodiment.

FIG. 1 illustrates a computer system 100 for performing data fixes according to an embodiment. Features and advantages of the present disclosure address the technical challenges of fixing data errors in a computer system. Additionally, embodiments of the disclosure address the challenges of deploying new applications so that the data is clean upon deployment. Embodiments of the present disclosure may be implemented in software as described herein and executed on one or more processors 102. As illustrated in FIG. 1, computer system 100 includes one or more databases 103. Computer system 100 may support multiple tenants. A tenant is a group of users who share a common access to one or more software systems with specific privileges to the software instance. With a multitenant architecture, a software application is designed to provide every tenant a dedicated share of the instance, including its data, configuration, user management, tenant individual functionality and non-functional properties. Sensitive portions of tenant data may be singled out for special secure handling. Accordingly, software applications 101a-n may implement a wide range of functionalities that involve storing data for a particular tenant running the application in database 103.

Here, such tenant data is stored in one or more databases in separate schemas for each tenant. For purposes of the present disclosure, a schema is software structure that includes tables, views, connection credentials, and may include other database artifacts (e.g., constraints, stored procedures and the like). As illustrated in FIG. 1, database(s) 103 include separate schemas 110a-n for storing data for different tenants. In some instances, different tenant schemas may have a same schema structure but different connection credentials for different tenants to ensure the security of each tenant's data. For example, in some embodiments the data stored in each schema 110a-n is master data corresponding to each tenant. Master data comprises a uniform set of identifiers and attributes that uniquely describe each tenant for processing operations that identify an identity of a particular tenant. For example, tenants may have their own uniquely identifiable master data, which is used in transaction processing and other operations where the tenant's identity is vital for further processing or for identifying the source of an action taken in the computer system. Master data of the tenants may be stored in dedicated database schemas of a region-specific data center, for example. If a business or security requirement arises such that a particular subset of the master data stored in the customer's dedicated schema needs to be changed, deleted, or modified, the data fix mechanisms of the present disclosure may ensure that the requirements are satisfied. Accordingly, each tenant may have their own schema in a database to provide clear data isolation between tenants. simultaneously providing the cost benefit of having multiple tenants housed in a single database. However, while this approach provides logical data isolation to the tenants in the ecosystem, other embodiments may place tenant data in separate databases for physical data isolation.

Computer system 100 may be used to modify data stored in a plurality of tenant schemas automatically. Computer system 100 includes a data fix software functionality (or just, "Data Fix") 111 for modifying data, such as tenant data, automatically. For instance, Data Fix 111 may receive a list of a plurality of schemas 110a-n stored in database 103 that are to have their tenant data updated. The list of schemas to be processed, as well as access information, may be obtained from a schema manager 114, which includes security information 115 about the schemas (e.g., access credentials) as well as other information about the schemas 116. The schema manager 114 may comprise a separate encrypted object storing administrative credentials for the schemas 110a-n, for example. The following is an example of an administrative credential:

```
{
    "id": "9c6367a1-ss44srk8-esthuhttr3623",
    "tenant_id" : "Cust1"
    "credentials": {
        "certificate": "-----BEGIN CERTIFICATE
           xasddassa -----END CERTIFICATE-----",
        "database_id": "asd31e1232131212sada",
        "host": "asd31e1232131212sada.hanacloud.com",
        "password": "secret",
        "port": "443",
        "schema": "Cust1",
```

```
     "user": "username"
   }
}
```

Data Fix 111 may comprise a plurality of pre-configured SQL commands ("SQL cmds") 112 for performing data modification on schemas 110a-n. Data Fix 111 may further include a batching code 113 to divide schemas 110a-n into a plurality of batches 117A-N, each comprising a portion of the schemas (e.g., schema 110i-j) from the database(s) 103. For instance, for the plurality of batches, computer system 100 may automatically, without user intervention, apply the pre-configured SQL commands 112 to the schemas 110i-j in a batch in parallel. The commands 112 applied to the schemas return results indicating that the schemas were either successfully modified or unsuccessfully modified, for example. Schema manager 114 advantageously provides access to schemas 110a-n to apply the pre-configured SQL commands 112 without exposing the administrative credentials to a user. This advantageously increases the security of the system.

Features and advantages of the present disclosure include starting or blocking the deployment of an application based on the successful or unsuccessful automated modification of tenant data. In some embodiments, data fixes may be performed prior to deployment of application code. For example, code changes to an application may be deployed to a production environment (where users run the code) on a periodic basis. When the system initiates an application deployment, a data fix may be performed. An application deployment may be blocked from starting when a result of the data fix indicates a schema was unsuccessfully modified. On the other hand, the application deployment may start when a result of the data fix indicates the batches of schemas were successfully modified. In some embodiments, the application deployment is executed through one or more containers and data fix may be executed as a job separate from the execution of the containers. Containers are packages of software that contain the elements to run an application in the target environment. A container may comprise one runtime unit for a service/application (e.g., multiple containers of a single application for load balancing). In this way, containers virtualize deployment and allow applications to run in a private data center, public cloud, or even other target systems, for example. In this example, applications 101a-n run on containers 150a-m. Each container may include one or more instances of an application, for example, and the same application be executed across multiple containers. An application running on a container without the latest code changes may need to be upgraded to capture new features, bug fixes, or the like. When deployment of a new container running an application with the latest code changes is initiated, data fixes according to the techniques described herein may be performed. If the data fixes are successful, the new container is deployed and made available to users. However, if the data fixes are unsuccessful, the deployment of the new container and application may be blocked until the data fixes are implemented. Automating the data fix process and connecting the results to the deployment process can dramatically improve the speed of deployments, such that only deployments with unsuccessful data fixes may require manual data fix procedures, for example.

Figure 2:
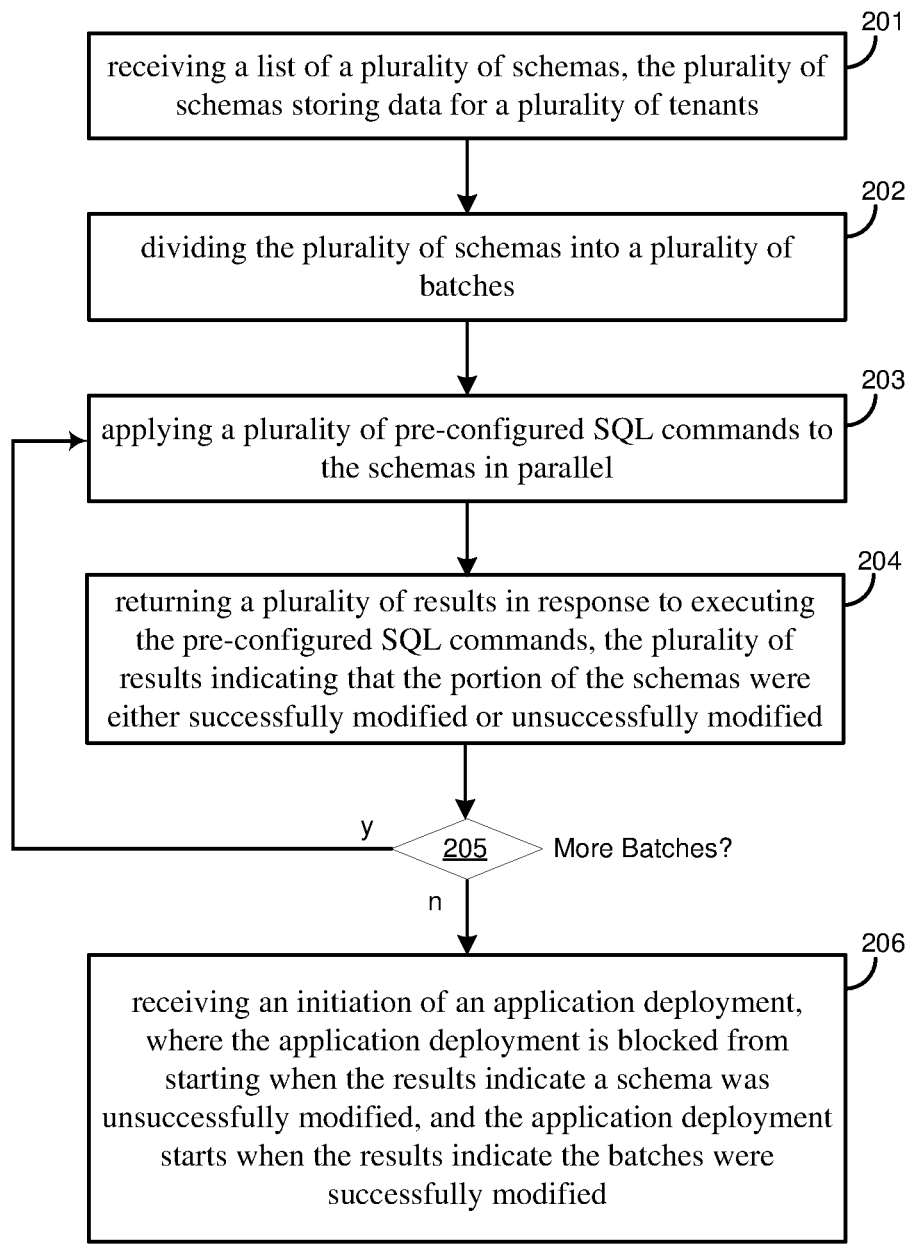
FIG. 2 illustrates a method according to an embodiment.

FIG. 2 illustrates a method according to an embodiment. At 201, a list of a plurality of schemas is received. The plurality of schemas store data for a plurality of tenants, where data corresponding to different tenants are stored in different schemas in one or more databases. At 202, the plurality of schemas is divided into a plurality of batches, where each batch comprises a portion of the schemas. At 203, a plurality of pre-configured SQL commands are applied to the schemas in each batch in parallel. At 204, results are returned in response to executing the pre-configured SQL commands. The results indicate that the schemas were either successfully modified or unsuccessfully modified. At 205, the system repeats steps 203 and 204 if more batches need to be processed. If there are no more batches, then the process moves to 206. At 206, an initiation of an application deployment is received. When the results indicate a schema was unsuccessfully modified, the application deployment is blocked from starting. However, when the results indicate the batches of schemas were successfully modified, the application deployment starts.

Figure 3:
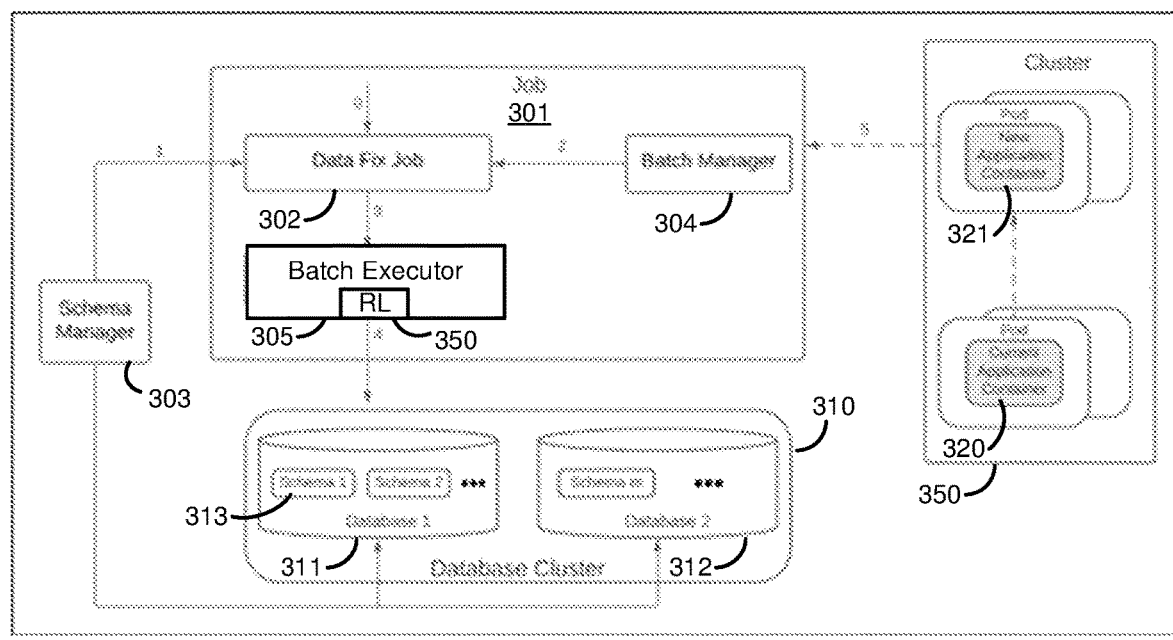
FIG. 3 illustrates a data fix system according to an embodiment.

FIG. 3 illustrates a data fix system according to an embodiment, including a solution for master data multi-schema data fixes in a clustered environment. FIG. 3 illustrates components of the solution. A job 301 includes batch manager 304, batch executor 305, and data fix job 302 coupled to schema manager 303. Schema manager 303 and batch executor 305 interface with database cluster 310 comprising databases 311-312, which each include master data schemas 313. The following is one example of a master data schema illustrating identifiers and attributes:

```
{
   "id": "1edc104d-6980-412f-ad6e-b038b778444c", -> Identifier
   "SystemId": "c82eaf38a-3709-4197-35a1-2105b3426b20", -> Identifier
   "Version": 1,
   "IsActive": true, -> Attribute
   "TimeCreated": "2023-01-15T08:29:11.426Z",
   "TimeUpdated": "2023-01-15T10:51:09.425Z",
   "displayName": "App_Updated_CKNM", -> Attribute
   "CompanyID": "ADASO", -> Attribute
   "CostCenterId": "CCasdasS5IM", -> Attribute
}
```

In this example, schema manager 303 is a secure cloud/object store that can manage tenants and their related metadata in a separate schema or a filesystem. It is the single source for getting all information related to the tenant, such as the database in which the schema of the tenant is stored, schema username, schema password, and other related information. Schema manager 303 returns the list of available schemas and their metadata to the data fix job 302 for further processing.

Figure 4A:
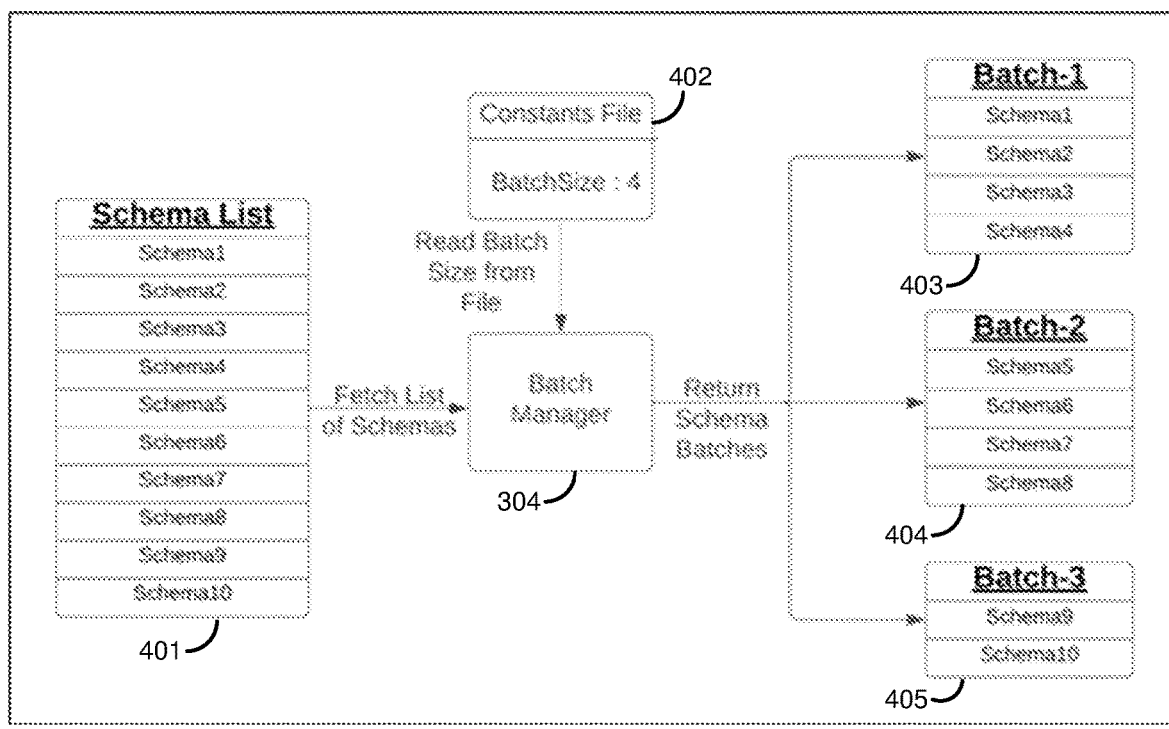
FIG. 4A illustrates an example process flow for a data fix job according to an embodiment.

FIG. 4A illustrates an example of schema batch processing according to an embodiment. Batch Manager 304 uses the list of schemas 401 fetched by schema manager 303 to split the schemas into batches 403-405. The batches may be of fixed size in some embodiments. The batch size may further be pre-configured in the code through a constants file 402 (described in more detail below). Constants file 402 may include the size of all the schema batches created (here, 4), which may be the same except for a last batch that may contain fewer schemas than the pre-configured batch size. Once the batches are created, the batches are passed to the main data fix job 302 for further processing.

To reduce the time taken for data fixes, data fixes may be done in parallel across schemas and databases in a batch (e.g., 100 schemas done 25 at a time as a batch, where each of the 25 schemas have their own thread). This advantageously reduces the time taken for the overall procedure and takes advantage of multi-threaded processors. Referring again to FIG. 3, batch executor 305 takes a batch of schemas as input and returns the result of applying a data fix on every schema in the batch in parallel. For all schemas in the batch, a new thread is spawned, and the data fix is applied simultaneously using the threads available to it. Each thread makes a connection to one of the databases 311-312 using the schema information fetched from the schema manager and then applies the SQL commands pre-configured in the constants file.

Data fix job 302 fetches the list of schemas received from the schema manager 303 and sends it to batch manager 304, which returns the schema batches for which a data fix needs to be applied. It also reads the Batch Size, Data Fix SQL Queries and SQL Query parameters that are pre-configured in the constants file.

Once the batches are created by batch manager 304, the batches are iterated over (e.g., serially) and a call is made to batch executor 305 for each batch. Batch executor 305 processes the input and returns the result of the data fix for every batch. These results are collected and processed further to check if the data fix has failed for any schema in all the batches. As mentioned above, if a data fix procedure for all schemas has been successful, data fix job 302 is deemed to be successful, and a new application container deployment is allowed to start. Otherwise, data fix job 302 fails, which blocks the new application container deployment from starting. Consequently, a manual data fix may be performed for the schemas where data fix has failed. After the manual data fix has been applied on the failing schemas, the application and data fix job 302 can be restarted to make the new application deployment come up.

As mentioned above, embodiments of automatic execution of SQL commands stored in a constants file (402 in FIG. 4) may include multi-schema and multi-databases, parallel data fixing, retry logic, and separate data fix and application containers, for example. Rather than manually applying data fixes to all the customer schemas in production, certain embodiments read pre-configured SQL commands to be applied from the constants file, and then apply them to the schemas in the environment. The constants file stores values needed for the application to run, low level programming artifacts, and the location where to write data manipulation scripts to be run against master data schemas (e.g., the location of the file where the data fix scripts are stored). The pre-configured SQL commands in the constants file comprise DML commands needed for the data fix. In some embodiments, only one constants file is used because all master data schemas are the same. The SQL commands are pre-configured in the constants file, and are in the form of Prepared SQL statements. Prepared SQL statements are predefined queries comprising placeholders for input values and are not recompiled on each execution, which prevents SQL Injection attacks, for example.

While performing a data fix for a particular schema in the ecosystem, the data fix can fail due to several issues such as failing to acquire DB Lock required to perform the data fix, network and environment stability, and other factors. To overcome the above issue and add a layer of robustness to the overall solution, certain implementations may include retry logic (RL) 350 implemented in batch executor 305, for example. The list of schemas for whom the data fix has failed is collected for every iteration. Then in the next iteration, the data fix procedure is reapplied to each of the failing schemas. Data Fix procedure re-tries are done for up to some predetermined number re-tries. For example, after the 3 re-tries, the final status of each schema's data fix is collected and returned to data fix job 302 for further processing. This adds a layer of robustness to the solution and ensures application does not crash due to momentary issues in the environment or database.

As illustrated in cluster 350, currently running application containers 320 are unaffected by the data fix process. However, new application containers 321 may be automatically blocked by batch manager 304 until a data fix has been successfully completed.

Figure 4B:
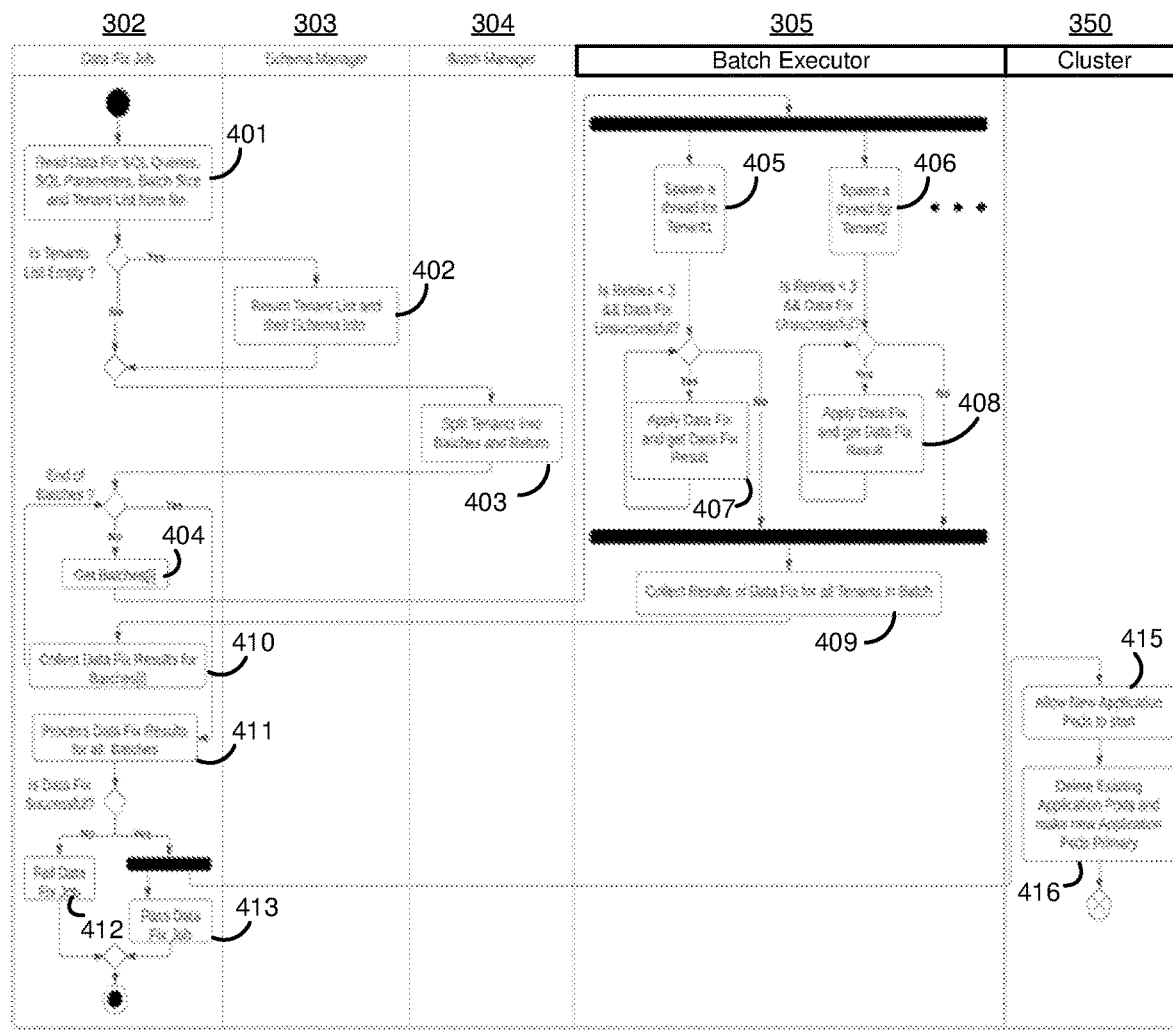
FIG. 4B illustrates an example of schema batch processing according to an embodiment.

FIG. 4B illustrates an example process flow for a data fix job according to an embodiment. At 401, data fix queries, parameters, batch size, and a tenant list are read by the data fix job 302. If the list is not empty, schema manager 303 returns the tenant list and schema information to data fix job 302 at 402. At 403, tenants are split into batches by batch manager 304. At 404, data fix job 302 sends the batches to batch executor 305, which spawns threads for each tenant schema in a particular batch at 405-406 and may perform up to N (e.g., N=3) re-tries at 407-408 to obtain a successful result, for example. At 409, results are collected and sent to the data fix job 302, which collects results for the batches at 410. At 411, the results for all batches are processed. In this example, if there are any unsuccessful results, the job fails at 412, and no action is taken on cluster 350 (no new container applications are created). However, if the results are successful at 413, data fix job 302 passes and new applications are deployed at 415 and old versions are deleted at 416.

Figure 5:
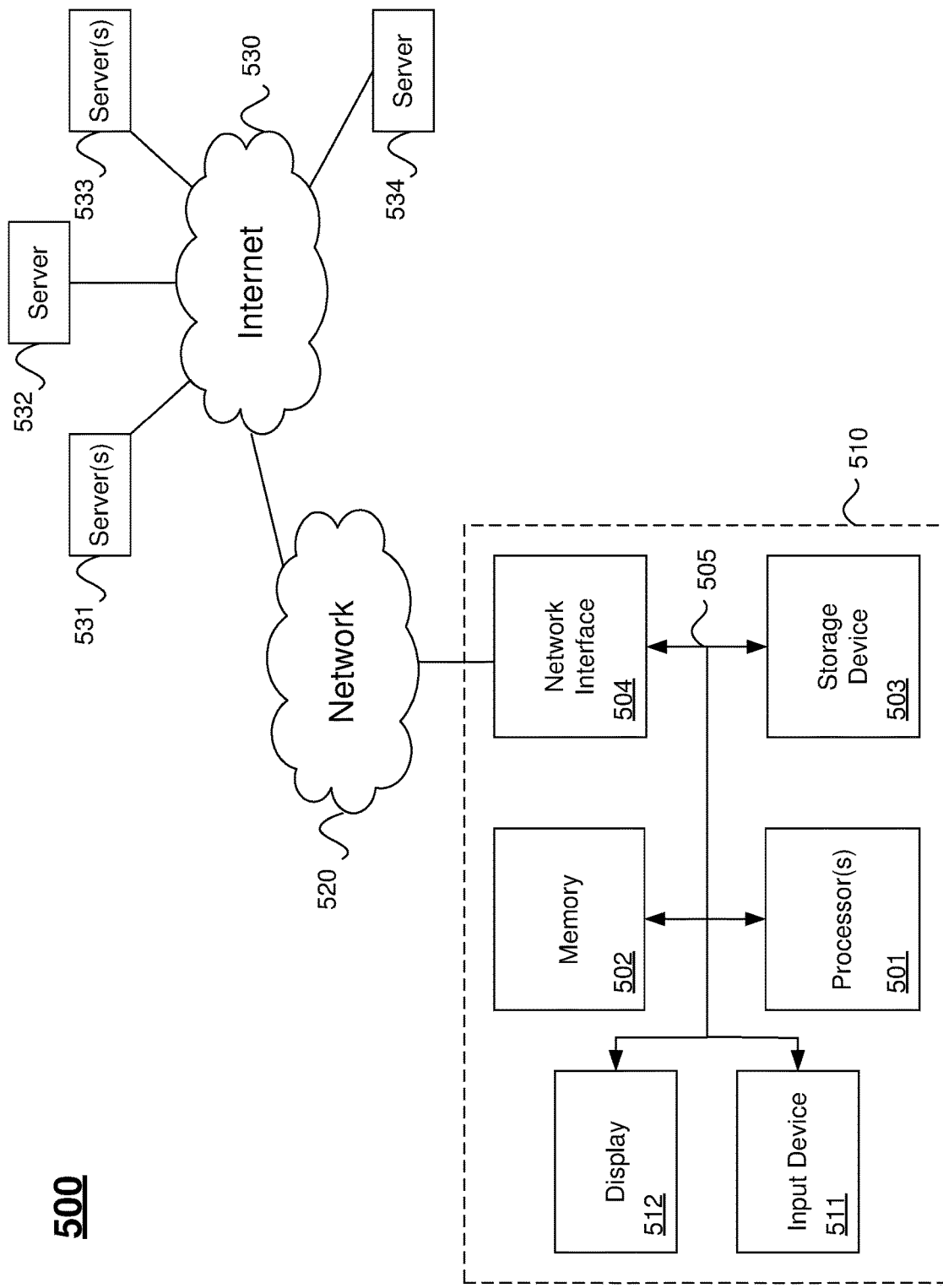
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a front end (e.g., a browser), for example, may access data and features on backend software systems that may reside on multiple different hardware servers on-prem 531 or across the Internet 530 on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

In one embodiment, the present disclosure includes a method of modifying data stored in a plurality of schemas comprising: receiving a list of a plurality of schemas, the plurality of schemas storing data for a plurality of tenants, wherein data corresponding to different tenants are stored in different schemas in one or more databases; dividing the plurality of schemas into a plurality of batches, each batch comprising a portion of the schemas; for the plurality of batches: automatically, without user intervention, applying a plurality of pre-configured SQL commands to the portion of the schemas in parallel; and returning a plurality of results in response to executing the pre-configured SQL commands, the plurality of results indicating that the portion of the schemas were either successfully modified or unsuccessfully modified; and receiving an initiation of an application deployment, wherein the application deployment is blocked from starting when the plurality of results indicates at least one schema was unsuccessfully modified, and wherein the application deployment starts when the plurality of results indicates the plurality of batches were successfully modified.

In another embodiment, the present disclosure includes a computer system comprising: at least one processor; at least one non-transitory computer readable medium storing computer executable instructions that, when executed by the at least one processor, cause the computer system to perform a method of modifying data comprising: receiving a list of a plurality of schemas, the plurality of schemas storing data for a plurality of tenants, wherein data corresponding to different tenants are stored in different schemas in one or more databases; dividing the plurality of schemas into a plurality of batches, each batch comprising a portion of the schemas; for the plurality of batches: automatically, without user intervention, applying a plurality of pre-configured SQL commands to the portion of the schemas in parallel; and returning a plurality of results in response to executing the pre-configured SQL commands, the plurality of results indicating that the portion of the schemas were either successfully modified or unsuccessfully modified; and receiving an initiation of an application deployment, wherein the application deployment is blocked from starting when the plurality of results indicates at least one schema was unsuccessfully modified, and wherein the application deployment starts when the plurality of results indicates the plurality of batches were successfully modified.

In another embodiment, the present disclosure includes a non-transitory computer-readable medium storing computer-executable instructions that, when executed by at least one processor, perform a method of modifying data, the method comprising: receiving a list of a plurality of schemas, the plurality of schemas storing data for a plurality of tenants, wherein data corresponding to different tenants are stored in different schemas in one or more databases; dividing the plurality of schemas into a plurality of batches, each batch comprising a portion of the schemas; for the plurality of batches: automatically, without user intervention, applying a plurality of pre-configured SQL commands to the portion of the schemas in parallel; and returning a plurality of results in response to executing the pre-configured SQL commands, the plurality of results indicating that the portion of the schemas were either successfully modified or unsuccessfully modified; and receiving an initiation of an application deployment, wherein the application deployment is blocked from starting when the plurality of results indicates at least one schema was unsuccessfully modified, and wherein the application deployment starts when the plurality of results indicates the plurality of batches were successfully modified.

In one embodiment, the list of the plurality of schemas is received from a schema manager, the schema manager comprising a separate encrypted object storing administrative credentials for the plurality of schemas, the schema manager providing access to the plurality of schemas to apply the plurality of pre-configured SQL commands without exposing the administrative credentials to a user.

In one embodiment, automatically applying a plurality of pre-configured SQL commands to the portion of the schemas in parallel comprises: generating a thread for each schema of the portion of the schemas; connecting, by each thread, to one or more databases using the administrative credentials from the schema manager; and applying, by each thread, the plurality of pre-configured SQL commands to a particular one of the portion of the schema.

In one embodiment, the data stored in each schema is master data corresponding to each tenant, and wherein the master data comprises a uniform set of identifiers and attributes that uniquely describe each tenant for processing operations that identify an identity of a particular tenant.

In one embodiment, the plurality of schemas has a same structure of schemas comprising tables and views, and wherein different schemas have different connection credentials.

In one embodiment, the pre-configured SQL commands are predefined queries comprising placeholders for input values and are not recompiled on each execution.

In one embodiment, the pre-configured SQL commands are SQL data manipulation language (DML) commands that modify data and do not modify a structure of the schema.

In one embodiment, the pre-configured SQL commands are stored in a single file, the file further comprising values for running the application.

In one embodiment, the application deployment is executed through one or more containers and said method of modifying data is executed as a job separate from the execution of the one or more containers.

In one embodiment, the above techniques further comprising, before receiving the initiation of the application deployment, and when one of plurality of results indicates that one or more schemas were unsuccessfully modified, automatically re-applying the plurality of pre-configured SQL commands to the one or more schemas.

In one embodiment, the received list of a plurality of schemas is a pre-determined list of schemas.

In one embodiment, the plurality of schemas is stored in a same database.

In one embodiment, each schema is stored in a different database.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method of modifying data stored in a plurality of schemas comprising:
receiving a list of a plurality of schemas, the plurality of schemas storing data for a plurality of tenants, wherein data corresponding to different tenants are stored in different schemas in one or more databases;
dividing the plurality of schemas into a plurality of batches, each batch comprising a portion of the schemas;
for the plurality of batches:
automatically, without user intervention, applying a plurality of pre-configured SQL commands to the portion of the schemas in parallel; and
returning a plurality of results in response to executing the pre-configured SQL commands, the plurality of results indicating that the portion of the schemas were either successfully modified or unsuccessfully modified; and
receiving an initiation of an application deployment, wherein the application deployment is blocked from starting when the plurality of results indicates at least one schema was unsuccessfully modified, and wherein the application deployment starts when the plurality of results indicates the plurality of batches were successfully modified,
wherein the list of the plurality of schemas is received from a schema manager, the schema manager comprising a separate encrypted object storing administrative credentials for the plurality of schemas, the schema manager providing access to the plurality of schemas to apply the plurality of pre-configured SQL commands without exposing the administrative credentials to a user, and
wherein automatically applying a plurality of pre-configured SQL commands to the portion of the schemas in parallel comprises:
generating a thread for each schema of the portion of the schemas;
connecting, by each thread, to one or more databases using the administrative credentials from the schema manager; and
applying, by each thread, the plurality of pre-configured SQL commands to a particular one of the portion of the schema.

2. The method of claim 1, wherein the data stored in each schema is master data corresponding to each tenant, and wherein the master data comprises a uniform set of identifiers and attributes that uniquely describe each tenant for processing operations that identify an identity of a particular tenant.

3. The method of claim 1, wherein the plurality of schemas has a same structure of schemas comprising tables and views, and wherein different schemas have different connection credentials.

4. The method of claim 1, wherein the pre-configured SQL commands are predefined queries comprising placeholders for input values and are not recompiled on each execution.

5. The method of claim 4, wherein the pre-configured SQL commands are SQL data manipulation language (DML) commands that modify data and do not modify a structure of the schema.

6. The method of claim 4, wherein the pre-configured SQL commands are stored in a single file, the file further comprising values for running the application.

7. The method of claim 1, wherein the application deployment is executed through one or more containers and said method of modifying data is executed as a job separate from the execution of the one or more containers.

8. The method of claim 1, further comprising, before receiving the initiation of the application deployment, and when one of plurality of results indicates that one or more schemas were unsuccessfully modified, automatically re-applying the plurality of pre-configured SQL commands to the one or more schemas.

9. The method of claim 1, wherein the received list of a plurality of schemas is a pre-determined list of schemas.

10. The method of claim 1, wherein the plurality of schemas are stored in a same database.

11. The method of claim 1, wherein each schema is stored in a different database.

12. A computer system comprising:
at least one processor;
at least one non-transitory computer readable medium storing computer executable instructions that, when executed by the at least one processor, cause the computer system to perform a method of modifying data comprising:
receiving a list of a plurality of schemas, the plurality of schemas storing data for a plurality of tenants, wherein data corresponding to different tenants are stored in different schemas in one or more databases;
dividing the plurality of schemas into a plurality of batches, each batch comprising a portion of the schemas;
for the plurality of batches:
automatically, without user intervention, applying a plurality of pre-configured SQL commands to the portion of the schemas in parallel; and
returning a plurality of results in response to executing the pre-configured SQL commands, the plurality of results indicating that the portion of the schemas were either successfully modified or unsuccessfully modified; and
receiving an initiation of an application deployment, wherein the application deployment is blocked from starting when the plurality of results indicates at least one schema was unsuccessfully modified, and wherein the application deployment starts when the plurality of results indicates the plurality of batches were successfully modified,
wherein the list of the plurality of schemas is received from a schema manager, the schema manager comprising a separate encrypted object storing administrative credentials for the plurality of schemas, the schema manager providing access to the plurality of schemas to apply the plurality of pre-configured SQL commands without exposing the administrative credentials to a user, and wherein automatically applying a plurality of pre-configured SQL commands to the portion of the schemas in parallel comprises:

generating a thread for each schema of the portion of the schemas;

connecting, by each thread, to one or more databases using the administrative credentials from the schema manager; and applying, by each thread, the plurality of pre-configured SQL commands to a particular one of the portion of the schema.

13. The computer system of claim 12, wherein the data stored in each schema is master data corresponding to each tenant, and wherein the master data comprises a uniform set of identifiers and attributes that uniquely describe each tenant for processing operations that identify an identity of a particular tenant.

14. The computer system of claim 12, wherein the pre-configured SQL commands are predefined queries comprising placeholders for input values and are not recompiled on each execution.

15. A non-transitory computer-readable medium storing computer-executable instructions that, when executed by at least one processor, perform a method of modifying data, the method comprising:

receiving a list of a plurality of schemas, the plurality of schemas storing data for a plurality of tenants, wherein data corresponding to different tenants are stored in different schemas in one or more databases;

dividing the plurality of schemas into a plurality of batches, each batch comprising a portion of the schemas;

for the plurality of batches:

automatically, without user intervention, applying a plurality of pre-configured SQL commands to the portion of the schemas in parallel; and returning a plurality of results in response to executing the pre-configured SQL commands, the plurality of results indicating that the portion of the schemas were either successfully modified or unsuccessfully modified; and receiving an initiation of an application deployment, wherein the application deployment is blocked from starting when the plurality of results indicates at least one schema was unsuccessfully modified, and wherein the application deployment starts when the plurality of results indicates the plurality of batches were successfully modified, wherein the list of the plurality of schemas is received from a schema manager, the schema manager comprising a separate encrypted object storing administrative credentials for the plurality of schemas, the schema manager providing access to the plurality of schemas to apply the plurality of pre-configured SQL commands without exposing the administrative credentials to a user, and wherein automatically applying a plurality of pre-configured SQL commands to the portion of the schemas in parallel comprises:

generating a thread for each schema of the portion of the schemas;

connecting, by each thread, to one or more databases using the administrative credentials from the schema manager; and applying, by each thread, the plurality of pre-configured SQL commands to a particular one of the portion of the schema.

16. The non-transitory computer-readable medium of claim 15, wherein the data stored in each schema is master data corresponding to each tenant, and wherein the master data comprises a uniform set of identifiers and attributes that uniquely describe each tenant for processing operations that identify an identity of a particular tenant.

* * * * *